June 7, 1966     S. M. BAGNO     3,255,398
STANDBY BATTERY NETWORK
Filed March 11, 1963
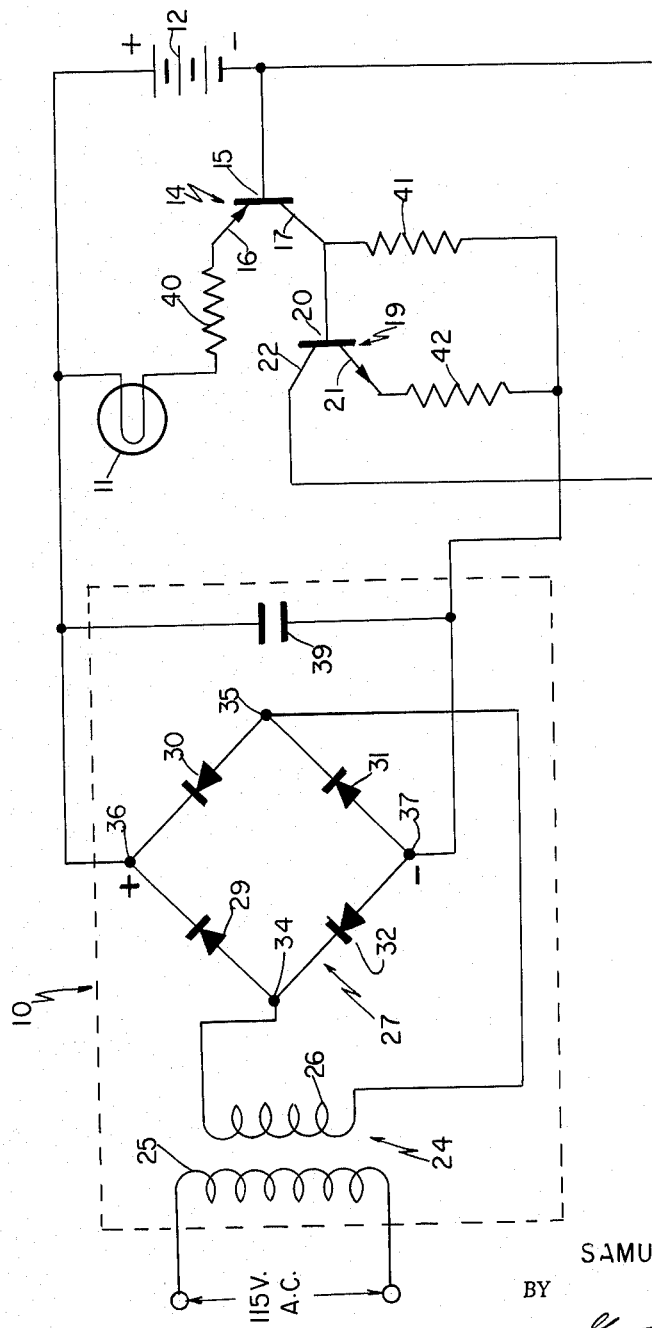
INVENTOR.
SAMUEL M. BAGNO
BY
AGENT United States Patent Office
3,255,398
Patented June 7, 1966

3,255,398
STANDBY BATTERY NETWORK
Samuel M. Bagno, Belleville, N.J., assignor to Specialties Development Corporation, Belleville, N.J., a corporation of New Jersey
Filed Mar. 11, 1963, Ser. No. 264,219
4 Claims. (Cl. 320—5)

The present invention relates to battery networks, and, more particularly, to networks where a load is normally supplied by a main power source and a storage battery is provided to supply the load in the event of failure of the main power source.

In networks of this type, provision is made to maintain the storage battery in fully charged condition so that it can properly operate the load device upon failure of the main power source. One method which has been used in such networks to maintain a full charge in the storage battery is that of continuously passing a small charging current through the battery. A network using this method is disclosed in applicants co-pending application for Letters Patent Serial No. 89,392, filed February 15, 1961.

In order to prevent damage to the battery it is necessary that the charging current be maintained below a predetermined value. However, the output of the main power source supplying this charging current is normally derived from a power line which experiences voltage fluctuations from time to time. These line voltage changes produce changes in the voltage output of the main power source. In previously known networks of this type, the charging current changed as a result of such voltage variations, therefore, when the network was adjusted to provide a sufficient charging current under normal conditions, a surge in the line voltage would cause the charging current to increase to a dangerous value.

While the present invention may be used to provide standby power for loads of various types, it is especially suited for use in photo-electric detecting apparatus to supply standby power for a lamp which casts a beam of light onto a photo-cell. The photo-cell is connected to circuitry for giving an indication when the light beam is interrupted by the passage of an object through the light beam. Therefore, when the lamp burns out, the apparatus gives a false indication that an object is interrupting the light beam. The life of a lamp is dependent upon the voltage applied to it, the greatest life being achieved when the applied voltage is maintained at the lowest value which will produce the light required. However, in previously known standby power networks the voltages provided by the network varied with line voltage variations, therefore, a voltage greater than that required to produce the necessary light was applied to the lamp so that a decrease in line voltage did not cause the light level to drop below the minimum required to prevent an indication from being given.

Accordingly, an object of the present invention is to provide a standby battery network which is not subject to the foregoing difficulties.

Another object is to provide such a network in which a closely regulated charging current is delivered to the battery.

Another object is to provide such a network which the charging current is not affected by line voltage variations.

Another object is to provide such a network in which the charging current is interrupted by failure of the load.

Another object is to provide such a network in which provides constant voltage to the load.

Another object is to provide such a network for delivering power to a lamp in a manner which prolongs the life of the lamp.

Another object is to provide such a network for applying a steady voltage of minimum value to the lamp of photoelectric detecting apparatus.

A further object is to provide such a network which is simple, highly reliable, and inexpensive.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a main source of direct current electrical power, a transistor having its emitter electrode connected to a first terminal of the main source through the load device and having its collector electrode connected to the second terminal of the main source, circuitry connected between the base electrode of the transistor and the second terminal of the main source for conducting the base current of the transistor and a battery connected between the first terminal of the source and the base electrode so that it is charged by the current flowing between the terminals through the battery and the base current conducting circuitry.

A preferred embodiment of the invention has been chosen for purposes of illustration and description, and is shown in the accompanying drawing, forming a part of the specification, wherein:

The single figure of the drawing is a wiring diagram of a network in accordance with the present invention.

Referring to the drawing in detail, a network is shown which generally comprises a main power source 10, an electrical load herein illustrated as a lamp 11 which may be utilized to cast a beam of light onto a photo-cell; a storage battery 12; a transistor 14 having a base electrode 15, an emitter electrode 16 and a collector electrode 17; and a transistor 19 having a base electrode 20, an emitter electrode 21, and a collector electrode 22.

The main power source 10 includes a step-down transformer 24 having a primary winding 25 connected to an alternating current line and a secondary winding 26, a bridge rectifier 27 comprised of four diodes 29 to 32 and having a pair of input terminals 34 and 35 connected across the secondary winding 26 and having a positive output terminal 36 and a negative output terminal 37, and a capacitor 39 connected between the output terminals 34 and 35.

The lamp 11 is connected in series with a resistor 40 between the positive terminal 36 and the emitter 16 of transistor 14, and the battery 12 has its positive terminal connected to the positive terminal 36 and its negative terminal connected to the base 15. The collector 17 is connected through a resistor 41 to the negative terminal 37 and is also directly connected to the base 20 of transistor 19. The emitter 21 of the transistor 19 is connected through a resistor 42 to the negative terminal 37, and the collector 22 is connected to the base 15 of the transistor 14.

In the illustrative embodiment, the alternating current line delivers 115 volts, the transformer 24 steps the line voltage down to 12 volts, the battery is a three cell nickel cadmium storage battery having a voltage of 3.75 volts when fully charged, the lamp 11 is rated at 4.7 volts, the transistor 14 is of the PNP type, the transistor 19 is of the NPN type, and the resistors 40, 41, and 42 have values of 0.5 ohm, 10 ohms and 250 ohms respectively.

In operation, the low voltage output of the transformer 24 is full wave rectified by the bridge rectifier 27 and filtered by the capacitor 39 to provide direct current for illuminating the lamp and for charging the battery 12.

The battery 12 holds the base 15 negative with respect to the emitter 16 whereby a current flows in the emitter-base circuit of the transistor 14 which controls the conduction of transistor 14. A current path is thus provided from the terminal 36 through the lamp 11, the resistor 40, the emitter-collector circuit of the transistor 14, and the resistor 41 to the terminal 37. A portion of the collector current of the transistor 14 flows through the base-emitter circuit of the transistor 19 and controls the conduction of that transistor to establish a closed circuit for the base current of the transistor 14 through the collector-emitter circuit of the transistor 19 and the resistor 42 to the terminal 37. A battery charging current is thereby permitted to flow from the terminal 36 though the battery 12, the collector emitter circuit of the transistor 19 and the resistor 42 to the terminal 37.

In the illustrative embodiment, 3.2 volts is impressed across the lamp 11, the voltage drop across the resistor 40 is 0.45 volt, the difference in potential between the base 15 and the emitter 16 is 0.10 volt, and a charging current of 5 milliamperes is passed through the battery. This charging current is sufficient to maintain the battery fully charged and can be applied to the battery indefinitely without causing damage.

The battery 12 maintanis the base 15 at a constant voltage with respect to the positive terminal and, since the transistor 14 is connected in an emitter follower configuration, the emitter 16 is also held at a constant voltage with respect to the terminal 36. Therefore, the current flowing through the lamp 11 and the resistor 40 is constant and independent of the voltage at the terminal 36. Since the emitter current of the transistor 14 is constant, the collector current thereof is also constant, whereby the voltage drop across the resistor 41 is constantly maintaining a constant bias voltage on the base 20 of the transistor 19. The constant bias voltage on the base 20 maintains constant emitter and collector currents in the transistor 19 whereby the charging current flowing through the battery 12 is constant and independent of any variations in the voltage across the terminals 36 and 37 which might result from voltage variations in the alternating current line. Since the currents flowing in the network cannot change, any variation in voltage across the terminals 36 and 37 appears as a variation in the collector to emitter voltage of the transistors.

Incandescent lamps have a relatively short life, therefore, in networks of this type it is important that the battery be protected against over charging as a result of the failure of the lamp. In the network of the present invention, when the lamp 11 fails, the current flow through the emitter-collector circuit of the transistor 14 is interrupted thus removing the bias from the base 20 of the transistor 19. The transistor 19 therefore turns off and the current charging the battery 12 is interrupted. The battery 12 is thus protected from being subjected to an excessive charging current when the lamp fails.

In the event of a failure in the main power source 10 or in the alternating current line to which it is connected, the battery 12 supplies electrical power to maintain the lamp illuminated. The current produced by the battery 12 flows from the positive terminal thereof through the lamp 11, the resistor 40 and the emitter-base circuit of the transistor 14 to the negative terminal of the battery. The emitter-base circuit of the transistor acts as a diode biased in the forward direction and therefore presents a very low resistance to this current flow. When power from the main source 10 is restored, the charging of the battery resumes and the lamp is once again supplied by the main source.

From the foregoing description, it will be seen that the present invention provides a simple, reliable and inexpensive standby battery network which provides a constant voltage to the load and protects the battery from damage by closely regulating the charging current in a manner such that the charging current is not affected by line voltage variations and is interrupted in the event of a failure of the load.

Other and further objects of the invention will be obvious upon an understanding of the illustrative embodiment about to be described, or will be indicated in the appended claims, and various advantages not referred to herein will occur to one skilled in the art upon employment of the invention in practice.

I claim:
1. A standby battery network comprsing in combination a main source of direct electrical power subject to voltage fluctuations and having first and second terminals, a transistor having an emitter electrode connected to said first terminal and having a collector electrode and a base electrode, a load device connected between said emitter and said first terminal, a battery connected between said base electrode and said first terminal, and electrical switch means for providing a constant charging current through said battery when the collector current of said transistor is constant and for interrupting said chargng current when said collector current is interrupted, said switch means having a controlling circuit connected between said collector and said second terminal and a controlled circuit connected between said base and said second second terminal to provide a battery charging current path between terminals through said battery, said transistor and said battery being connected so that said battery maintains said base and emitter electrodes at constant potentials with respect to said first terminal so that the emitter current is held constant to maintain a constant voltage across said load and to produce a constant collector current.

2. A network according to claim 1, wherein said load is an electric lamp and said battery produces a base current in said transistor sufficient to illuminate said lamp in the event said main power source fails.

3. A network according to claim 2, wherein said transistor and said lamp are connected so that the emitter current of said transistor is interrupted when said lamp fails whereby the failure of said lamp results in the interruption of the battery charging current to prevent over charging of the battery.

4. A network according to claim 1, wherein said switch means is a second transistor having an emitter electrode and a collector electrode and a base electrode, the emitter-collector circuit of said second transistor being connected in series with said battery between said terminals.

References Cited by the Examiner
UNITED STATES PATENTS

| | | | |
|---|---|---|---|
| 2,715,710 | 8/1955 | Godshalk et al. | 320—35 X |
| 3,018,432 | 1/1962 | Palmer | 320—48 X |
| 3,045,169 | 7/1962 | Barber | 323—22 X |

LLOYD McCOLLUM, *Primary Examiner.*

S. WEINBERG, *Assistant Examiner.*